Aug. 9, 1960  J. A. BRANDAY  2,948,196
APPARATUS FOR MACHINING BAR STOCK OR THE LIKE
Filed April 23, 1958  2 Sheets-Sheet 2

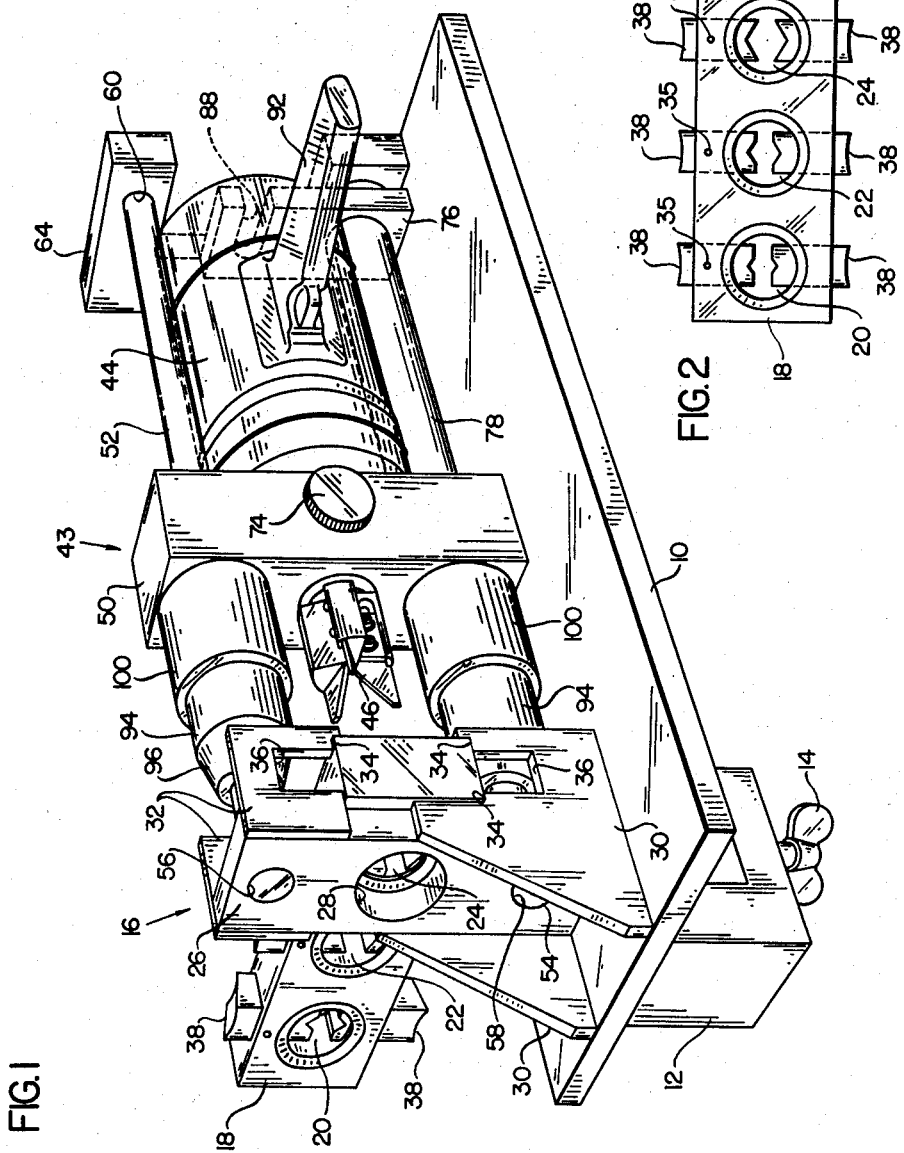

INVENTOR
JOHN A. BRANDAY
BY Teller & McCormick
ATTORNEYS

United States Patent Office 2,948,196
Patented Aug. 9, 1960

2,948,196

APPARATUS FOR MACHINING BAR STOCK OR THE LIKE

John A. Branday, 111 Front St., Middletown, Conn.

Filed Apr. 23, 1958, Ser. No. 730,341

5 Claims. (Cl. 90—14)

This invention relates to apparatus for machining bar stock or the like and, more specifically, to apparatus which is particularly adaptable for use in machining an end portion of a section of bar stock or a similar workpiece.

It is the general object of the present invention to provide apparatus of the type mentioned which is adapted to support a section of bar stock or the like in a suitable chuck and to movably support a cutting tool so that it may be advanced into and retracted out of engagement with the stock, the apparatus to include chuck actuating means operable automatically to cause the chuck to grip the stock as the tool is advanced toward the stock.

Another and a more specific object of the invention is to provide apparatus of the type mentioned including a chuck assembly carrying a plurality of chucks of different sizes, which chucks may be selectively utilized with the said chuck actuating means.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

Fig. 1 is a perspective view showing a presently preferred embodiment of the invention which is adapted to movably support a portable electric drill carrying a conventional chamfering tool, the portable electric drill and tool also being illustrated;

Fig. 2 is a front view of a chuck assembly comprising a plurality of chucks of different sides;

Figure 3:
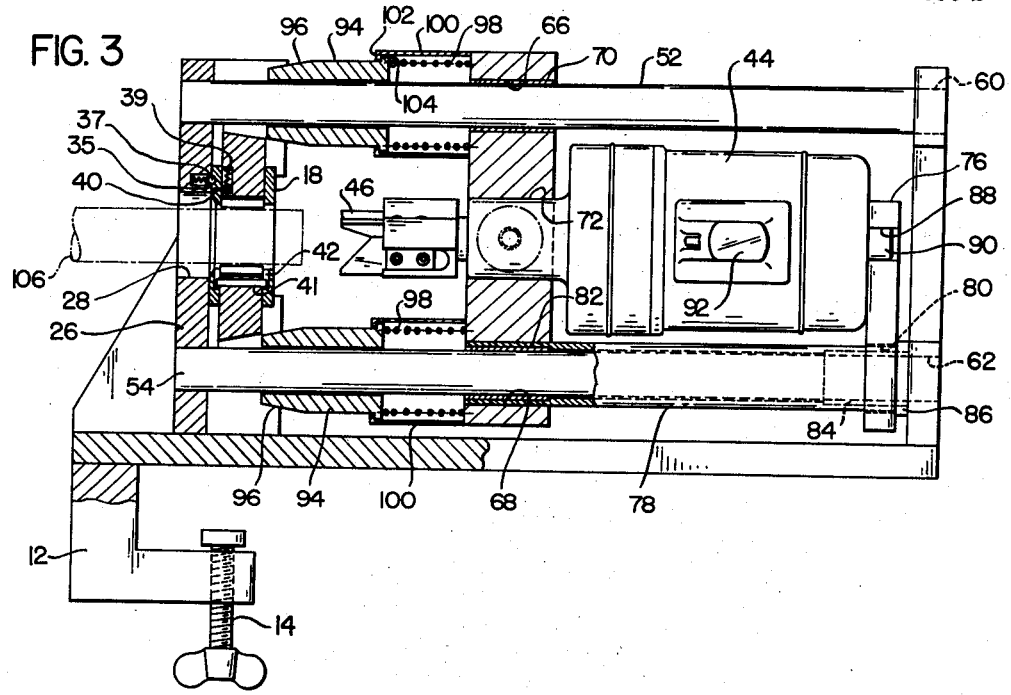
Figure 4:
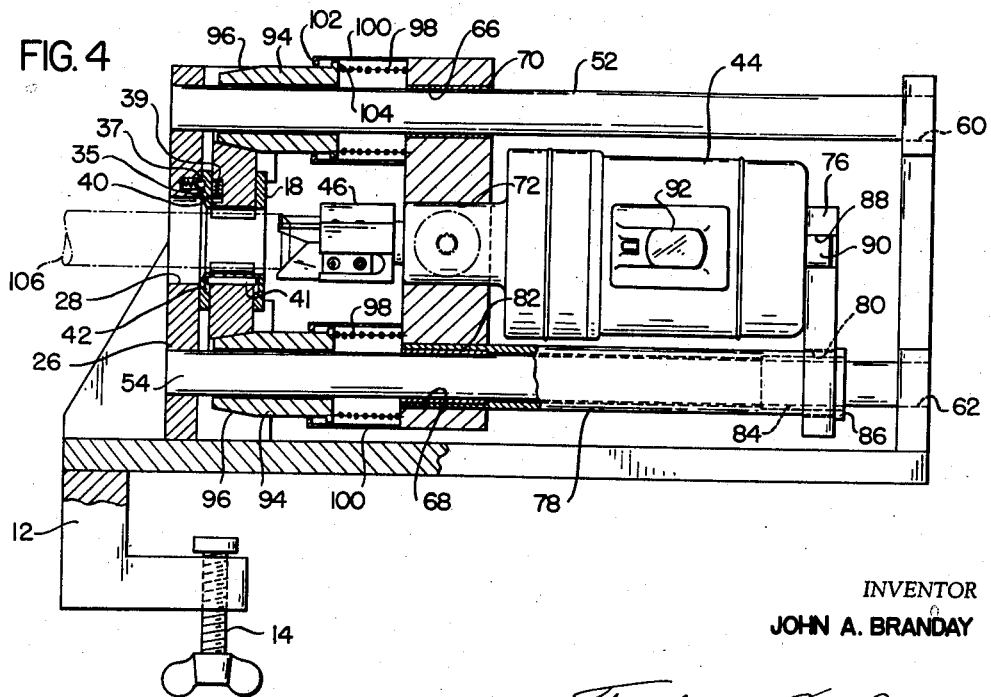

Fig. 3 is a longitudinal vertical section of the apparatus of Fig. 1 with some portions thereof shown in elevation and with the chamfering tool supported thereby shown in a position wherein it is retracted from the end of a section of bar stock also supported by the apparatus; and Fig. 4 is a longitudinal vertical section similar to Fig. 3, but showing the chamfering tool advanced into cutting engagement with the section of bar stock.

A first element of the apparatus of the present invention is a longitudinal base 10 which, in preferred form, is of generally rectangular shape. There is preferably provided suitable means for securing the base 10 of the apparatus, and thus the apparatus, to a worktable or the like and such means may comprise a generally L-shaped member 12 having one end connected to the underside of the said base and carrying a winged clamping bolt 14.

In accordance with the present invention, there is mounted on the base 10 of the apparatus a chuck supporting frame which is indicated generally by the reference numeral 16 and which carries a chuck adapted to be engaged with and grip and to be disengaged from a section of bar stock or a similar workpiece. A chuck of the jaw-type is provided and is adapted to be engaged with a workpiece by suitable camming means. In addition, and in order that the adaptability of the apparatus to workpieces of various sizes may be enhanced, there is preferably provided, instead of a single chuck, a chuck assembly comprising a plurality of jaw chucks of different sizes which may be selectively utilized for holding a workpiece. Accordingly, the preferred apparatus shown includes a chuck block 18 which carries three jaw chucks 20, 22 and 24, as best illustrated in Fig. 2, and which is adapted to be movably mounted on the supporting frame 16 as described hereinbelow.

The construction and form of the chuck supporting frame 16 may vary widely within the scope of the invention. The said frame may, for example, be cast integrally with the base 10 or it may be constructed of welded-together plates. Further, the frame 16 may be rigidly secured to the base 10 or there may be provided adjustable support means for accommodating movement of the said frame relative to the base. In the preferred embodiment of the invention shown, the chuck supporting frame 16 comprises a generally rectangular plate 26 which is rigidly secured at one end thereof to the base 10, as by welding. The plate 26 extends upwardly from the said base in a vertical transverse plane and has formed therein an opening 28 through which sections of bar stock or other similar workpieces may be extended longitudinally. Two similar plates 30, 30 are rigidly connected respectively along lower portions of opposite longitudinally extending sides of the plate 26 and extend therefrom in vertical longitudinal planes. Each of the plates 30, 30 engages along its lower edge the base 10 and may be rigidly secured thereto as by welding. Two additional similar plates 32, 32 are rigidly connected respectively along upper portions of opposite longitudinally extending sides of the plate 26 and extend therefrom in vertical longitudinal planes.

The lower plates 30, 30 and the upper plates 32, 32 support and guide the chuck block 18 for movement thereof transversely of the base 10. Suitable notches 34, 34 provided in the plates 30, 30 and 32, 32 slidably receive corners of the said block and the block is thereby maintained in spaced relation with the base 10 adjacent the rear transversely extending side of the frame plate 26. A slot 36 in each of the plates 30, 30 and 32, 32 accommodates transverse movement of the outer ends of the chuck jaws which extend above and below the block 18. Thus, the chuck block 18 may be moved transversely of the plates 30, 30 and 32, 32 and the base 10 so as to position a selected chuck 20, 22 or 24 in alignment with the opening 28 in the frame plate 26 for holding a workpiece extended through the said opening.

To aid in aligning a selected chuck with the opening 28 in the frame plate 26 there is preferably formed in the chuck block 18 a series of three detents 35. The detents 35 are adapted to receive a small spring biased ball 37 associated with the frame plate 26 as best illustrated in Figs. 3 and 4. The detents 35 are located in the chuck block 18 so that the ball 37 will be partially forced into one of the detents by the spring associated therewith when a selected chuck is aligned with the opening 28. Thus, an indication of proper alignment of a selected chuck with the opening is provided for the operator of the apparatus and resistance to accidental or unintended displacement of the chuck block 18 on the frame 16 is afforded.

As is best illustrated in Fig. 2, each of the chucks 20, 22 and 24 carried by the chuck block 18 comprises, in preferred form, a pair of opposing radially movable chuck jaws. In accordance with the presently preferred practice, wherein camming means are utilized as chuck engaging means, the jaws of the chucks 20, 22 and 24 are adapted to be cammed radially inwardly toward their respective chuck center lines. Accordingly, an inclined camming surface 38 is provided at the outer end of each chuck jaw. As will be obvious from the drawings, each of the chucks 20, 22, and 24 is adapted to accommodate sections of bar stock of different diameters and to securely hold the same with their center lines on the chuck centerline when the jaws of the chuck are cammed radially inwardly.

As best illustrated in Figs. 3 and 4, there is preferably provided in a suitable recess in the upper jaw of each of the chucks 20, 22 and 24 a small spring 39 engaging at one end a pin 40 which is fixedly secured in the chuck block 18. The springs 39 act against the pins 40 to bias the upper chuck jaws radially outwardly whereby to maintain the said jaws in spaced relation with the chuck centerline when they are not acted upon by the aforesaid chuck engaging means. In addition, the springs 39 and pins 40 cooperate to aid in releasing a workpiece from a selected chuck after machining thereof.

There is preferably also provided and embedded in the lower jaw of each of the chucks 20, 22, 24 a pin 41. The pins 41 extend through the chuck lower jaws and have their ends slidably disposed in suitable radially extending slots or channels 42 formed in the chuck block 18. Thus, the chuck lower jaws are free to move radially and are prevented from falling out of the block 18 when not in use.

In further accord with the present invention, there is provided a movable tool holder for moving a cutting tool toward and away from a workpiece engaged by a chuck mounted on the chuck supporting frame. The aforesaid chuck engaging means is operatively associated with the tool holder so as to be movable therewith. For effecting such operative association, there is provided connecting means operable to move the chuck engaging means so as to automatically engage a chuck with a workpiece as the tool holder moves a cutting tool toward the workpiece. Thereafter, the said connecting means accommodates additional movement of the cutting tool relative to the workpiece so that a desired machining operation on the workpiece may be completed.

The movable tool holder may be adapted for moving a cutting tool toward and away from a workpiece longitudinally, transversely or obliquely as required by various types of cutting tools and machining operations. The cutting tool may be manually driven or there may be provided power driving means therefor. In the preferred embodiment of the invention, the apparatus is particularly adapted for machining of the end portion of a section of bar stock or the like with a power driven cutting tool. More specifically, the apparatus is adapted for chamfering of the end portions of bar stock or the like and is constructed and arranged to carry, on a tool supporting frame 43, a power driving means comprising a portable electric drill power unit 44. As shown, the drill power unit 44, is of conventional type and has mounted in the chuck thereof the shank end of a chamfering tool 46. It will, however, be understood that a special chuck may be provided with only the electric motor portion of the portable electric drill power unit being utilized. The tool supporting frame 43 is movable, with the power unit 44 thereon, longitudinally of the base 10 of the apparatus and is thus adapted to move the chamfering tool 46 longitudinally toward and away from the end of a section of bar stock engaged in a chuck mounted on the frame 16. Thus, in the preferred embodiment of the invention, a movable tool holder is provided in the form of the chuck of the portable electric power unit 44.

In a preferred construction of the tool supporting frame 43, there is provided a front member 50 extending in a transverse plane upwardly from but in spaced relation with the base 10 of the apparatus. The member 50 is movable longitudinally of the base 10 and is preferably slidably mounted for such movement on first and second upper and lower longitudinal support and guide bars 52 and 54. The support bars 52 and 54 are spaced from the base 10 of the apparatus and are preferably respectively supported at one end thereof in suitable openings 56 and 58 in the chuck frame plate 26 and at the other end thereof in similar openings 60 and 62 formed in a transverse rear end plate 64 of the apparatus. Upper and lower openings 66 and 68 provided in the front member 50 respectively receive the upper and lower support bars 52 and 54. A bushing 70 may be disposed in the upper opening 66 in the front member 50 to permit the said member readily to slide on the support bar 52 and to reduce wear on the member. There is preferably provided in the front member 50 an opening 72 adapted to receive the forward and chuck encompassing portion of the housing of the portable electric drill unit 44. There is also preferably provided in association with the member 50 a retaining screw 74 having a head suitable for hand turning. The body of the screw 74 is adapted to extend transversely into the opening 72 of the member 50 and to engage the forward portion of the drill housing disposed therein.

A rear member 76 of the tool supporting frame 43 extends in a transverse plane upwardly from the base 10 and in spaced relation therewith and is connected for longitudinal movement with the front member 50 of the said frame. A sleeve 78, slidably mounted on the lower support and guide bar 54, interconnects the rear member 76 with the front member 50 of the frame 43. The sleeve 78 is rigidly secured at one end thereof to the member 50 as by a press fit engagement in the lower longitudinal opening 68 of the said member. The other end of the sleeve 78 is loosely received in a suitable opening 80 provided in the rear frame member 76. Front and rear bushings 82 and 84, slidable on the bar 54, preferably support the sleeve 78 thereon, the rear bushing 84 preferably being provided at one end with an annular flange 86 extending radially outwardly and rearwardly engaging the rear frame member 76 whereby to hold said member against the rearward end of the electric drill power unit 44. The rear member 76 which loosely engages the sleeve 54 is thus adapted to swing in a transverse plane about the said sleeve. A slot 88 is provided in the rear frame member 76 for receiving a projection 90 formed on the rearward end of the housing of the portable electric power unit 44.

It will be seen that the portable power unit 44 may be readily mounted on the tool supporting frame 43. The forward or chuck end thereof may be inserted into the front frame member opening 72 with the rear frame member 76 swung transversely aside. The rear frame member 76 may then be moved to the position shown in the drawings wherein the projection 90 on the power unit housing is disposed in the slot 88 for support by the said rear member. The retaining screw 74 may then be turned into engagement with the forward portion of the portable power unit housing whereupon the said unit and the tool carried thereby will be fixedly secured on the frame. Thereafter, the tool supporting frame 43 and the portable power unit 44 may be conveniently moved longitudinally on the support bars 52 and 54 by means of the drill handle 92 and the chamfering tool 46 will be thereby moved on the chuck center line toward and away from a workpiece engaged in a selected chuck.

The camming means for engaging the chuck jaws with a workpiece may take various forms within the scope of the invention. In preferred form, the said means comprises similar first and second camming plungers 94, 94 each having thereon a camming surface 96. Similarly, there may be wide variation in the form of the means which connect the camming means with the movable tool holder and which is operable to move said camming means so as to close the jaws of a selected chuck on a workpiece as a cutting tool is moved toward the workpiece and operable to accommodate additional movement of the cutting tool thereafter. In the preferred embodiment of the invention wherein there is provided the tool supporting frame 43 and wherein the camming means comprises the plungers 94, 94, the said plungers are preferably connected with the supporting frame for movement therewith. Thus, the plungers 94, 94 are indirectly connected with and movable with the tool holder which is constituted by the chuck of the portable electric drill unit 44. In addition, and for accommodating additional movement of a cutting tool relative to a workpiece after the camming means has closed the jaws of a chuck thereon, there is preferably provided spring means. In accordance with the presently preferred form, the said spring means comprises first and second springs 98, 98 by which the plungers 94, 94 are respectively connected to the tool supporting frame 43.

The first and second camming plungers 94, 94 are adapted respectively for engagement with the upper and lower jaws of the chucks 20, 22 and 24. The camming surface 96 provided on each of the plungers 94, 94 is preferably generally frusto-conical and inclined at an angle similar to the angle of inclination of the chuck jaw camming surfaces 38, 38. The jaw camming surfaces 38, 38 are preferably slightly concave, as shown, when frusto-conical camming plungers are utilized. Thus, forward longitudinal movement of the two plungers 94, 94 with the camming surfaces 96, 96 thereon respectively engaging the camming surfaces 38, 38 on the jaws of a selected chuck will result in the said jaws being urged radially inwardly toward the chuck center line.

Preferably, the first and second plungers 94, 94 are slidably mounted respectively on the longitudinal support and guide bars 52 and 54 and first and second generally cylindrical housings 100, 100 are provided for respectively telescopically receiving the rearward end portions of the plungers 94, 94. The housings 100, 100 are preferably rigidly secured respectively at one end thereof to the tool frame front member 50 and one of the springs 98 is disposed within each of said housings. Each spring 98 engages at opposite ends thereof the plunger which is associated with the housing containing the said spring and the front frame member 50. For retaining the ends of the plungers 94, 94 within their respective housings during rearward longitudinal movement of the tool frame 43, each housing 100 has formed at the plunger receiving end thereof an inwardly extending radial flange 102. Each plunger 94 is provided with a mating outwardly extending radial flange 104 which engages the housing flange 102 during rearward movement of the frame 43 whereby to retain a rearward end portion of the plunger in the housing.

It will be apparent from the foregoing that as the tool supporting frame 43 is moved longitudinally on the support bars 52 and 54 so as to advance the chamfering tool 46 toward a section of stock 106 disposed between the jaws of a selected chuck, the camming plungers 94, 94 will be moved respectively into engagement with the upper and lower jaws of the selected chuck as the chamfering tool 46 approaches the end of the stock. As a result of such engagement of the plungers with the jaws of the selected chuck, the said jaws will be urged radially inwardly into engagement with the stock as illustrated in Fig. 4. Thereafter, the springs 98, 98 will be compressed whereby to accommodate additional movement of the tool 46 relative to the stock and to permit completion of the chamfering operation on the stock end portion. When chamfering of the stock is completed and the tool is retracted, the camming plungers 94, 94 will be moved out of engagement with the selected chuck jaws by the flanges 102 and 104 whereupon the stock 106 may be readily removed from the chuck.

The invention claimed is:

1. Apparatus for machining an end portion of a section of bar stock or the like comprising a longitudinal base, a transverse chuck supporting frame mounted on the base, a chuck carried by the supporting frame and having a pair of opposing jaws adapted to be cammed radially inwardly toward the chuck center line into holding engagement with a section of stock, said chuck jaws being adapted to accommodate sections of bar stock of different diameters and to securely hold the same with their center lines on the chuck center line when cammed radially inwardly, a longitudinally movable tool supporting frame for moving a cutting tool on the chuck center line toward and away from stock engaged by the chuck, a pair of camming plungers, and spring means connecting each plunger to the tool supporting frame for longitudinal movement therewith, the said camming plungers being operable respectively to urge one of said chuck jaws radially inwardly into holding engagement with a section of stock as the tool supporting frame moves a cutting tool toward the stock and the said spring means thereafter accommodating additional movement of the cutting tool relative to the stock.

2. Apparatus for machining an end portion of a section of bar stock or the like comprising a longitudinal base, a transverse chuck supporting frame mounted on the base, a chuck carried by the supporting frame and having first and second opposing jaws each adapted to be cammed radially inwardly toward the chuck center line into holding engagement with a section of stock, said chuck jaws being adapted to accommodate sections of bar stock of different diameters and to securely hold the same with their center lines on the chuck center line when cammed radially inwardly, a longitudinally movable tool supporting frame for moving a cutting tool on the chuck center line toward and away from stock engaged by the chuck, first and second camming plungers respectively for urging said first and second chuck jaws into holding engagement with a section of stock, first and second housings respectively adapted to telescopically receive said first and second plungers and respectively connected to and movable with said tool supporting frame, and first and second springs respectively disposed in said first and second plunger housings and respectively engaging said first and second plungers whereby said plungers are moved to close the said chuck jaws on a section of stock as the tool supporting frame moves a cutting tool toward the stock and whereby additional movement of the cutting tool relative to the stock is thereafter accommodated.

3. Apparatus for machining an end portion of a section of bar stock or the like comprising a longitudinal base, a transverse chuck supporting frame mounted on the base, a chuck carried by the supporting frame and having first and second opposing jaws each adapted to be cammed radially inwardly toward the chuck center line into holding engagement with a section of stock, said chuck jaws being adapted to accommodate sections of bar stock of different diameters and to securely hold the same with their center lines on the chuck center line when cammed radially inwardly, first and second longitudinal support and guide bars spaced from the base, a tool supporting frame movably mounted on said support bars for moving a cutting tool on the chuck center line toward and away from stock engaged by the chuck, first and second camming plungers movably mounted respectively on said first and second support bars and respectively adapted for urging said first and second chuck jaws into holding engagement with a section of stock, first and second housings respectively adapted to telescopically receive said first and second plungers and respectively connected to and movable with said tool supporting frame, and first and second springs respectively disposed in said first and second plunger housings and respectively engaging said first and second plungers whereby said plungers are moved to close the said chuck jaws on a section of stock as the tool supporting frame moves a cutting tool toward the stock and whereby additional movement of the cutting tool relative to the stock is thereafter accommodated.

4. Apparatus for machining bar stock or the like comprising a base, a chuck supporting frame mounted on the base, a chuck carried by the supporting frame and having a pair of opposing jaws adapted to be cammed radially inwardly toward the chuck center line into holding engagement with a section of stock, said chuck jaws being adapted to accommodate sections of bar stock of different diameters and to securely hold the same with their center lines on the chuck center line when cammed radially inwardly, power driving means for a cutting tool, a movable tool supporting frame for carrying the power driving means and a cutting tool driven thereby and for moving such cutting tool toward and away from stock engaged by the chuck on the chuck center line, a pair of camming plungers, and spring means connecting each plunger to the tool supporting frame for movement therewith, the said camming plungers being operable respectively to urge one of said chuck jaws radially inwardly into holding engagement with a section of stock as the tool supporting frame moves a cutting tool toward the stock and the said spring means thereafter accommodating additional movement of the cutting tool relative to the stock.

5. Apparatus for machining bar stock or the like comprising a base, a chuck supporting frame mounted on the base, a chuck carried by the supporting frame and having a pair of opposing jaws adapted to be cammed radially inwardly toward the chuck center line into holding engagement with a section of stock, said chuck jaws being adapted to accommodate sections of bar stock of different diameters and to securely hold the same with their center lines on the chuck center line when cammed radially inwardly, a portable electric drill power unit, a movable tool supporting frame for carrying the portable electric drill power unit and for moving a rotary cutting tool driven thereby toward and away from stock engaged by the chuck on the chuck center line, a pair of camming plungers, and spring means connecting each plunger to the tool supporting frame for movement therewith, the said camming plungers being operable respectively to urge one of said chuck jaws radially inwardly into holding engagement with a section of stock as the tool supporting frame moves a cutting tool toward the stock and the said spring means thereafter accommodating additional movement of the cutting tool relative to the stock.

References Cited in the file of this patent

UNITED STATES PATENTS

| 1,970,018 | Poole | Aug. 14, 1934 |
| 2,527,968 | Sherman et al. | Oct. 31, 1950 |

FOREIGN PATENTS

| 969,467 | France | May 24, 1950 |